3,467,970
TRANSPORTING AND LIFTING DEVICE
COMBINED WITH A BATHTUB FOR
INVALIDS
Curt Adils Ingemansson, Brobysjukhuset,
Broby, Sweden
Filed Apr. 26, 1965, Ser. No. 450,827
Claims priority, application Sweden, Apr. 27, 1964,
5,204/64; Nov. 18, 1964, 13,891/64
Int. Cl. A47k 3/12
U.S. Cl. 4—185
6 Claims

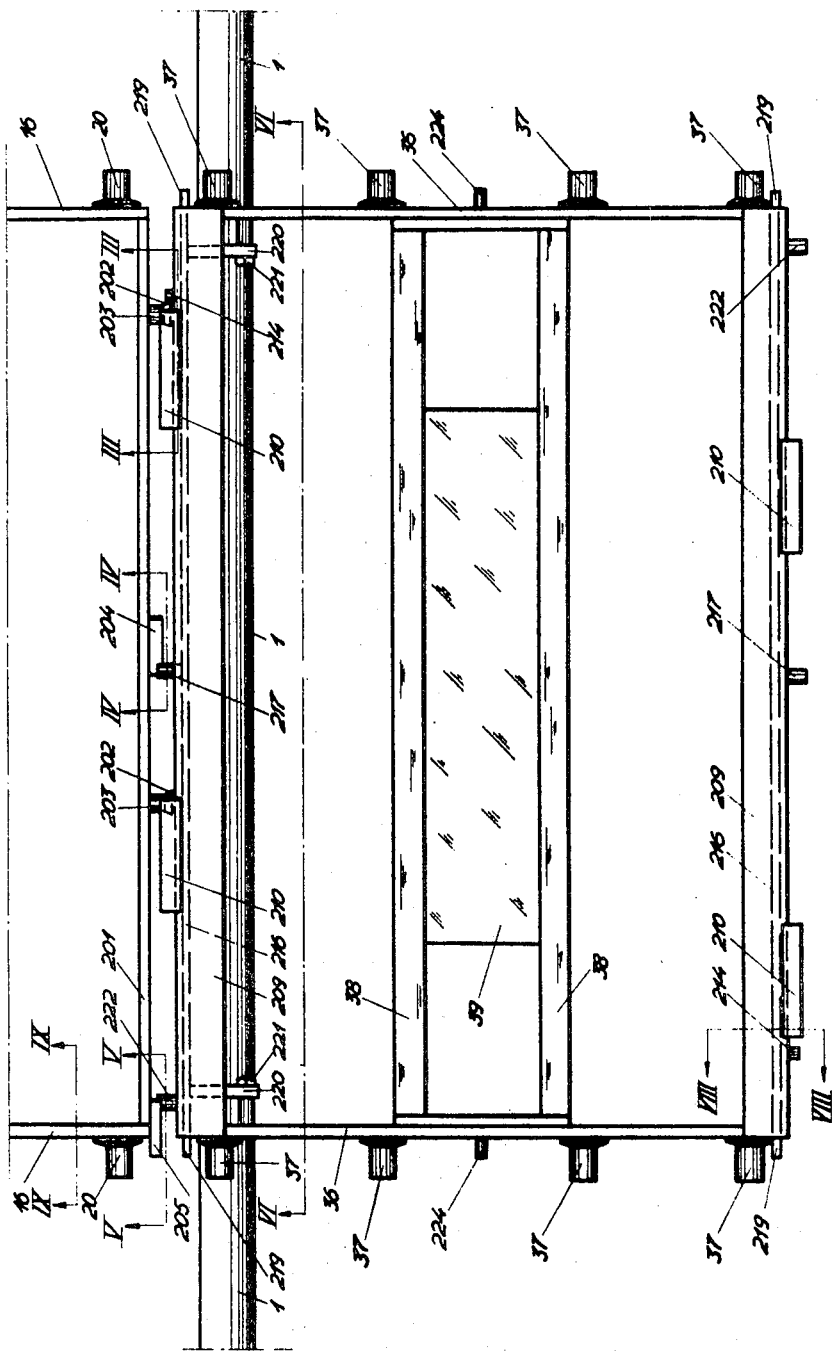

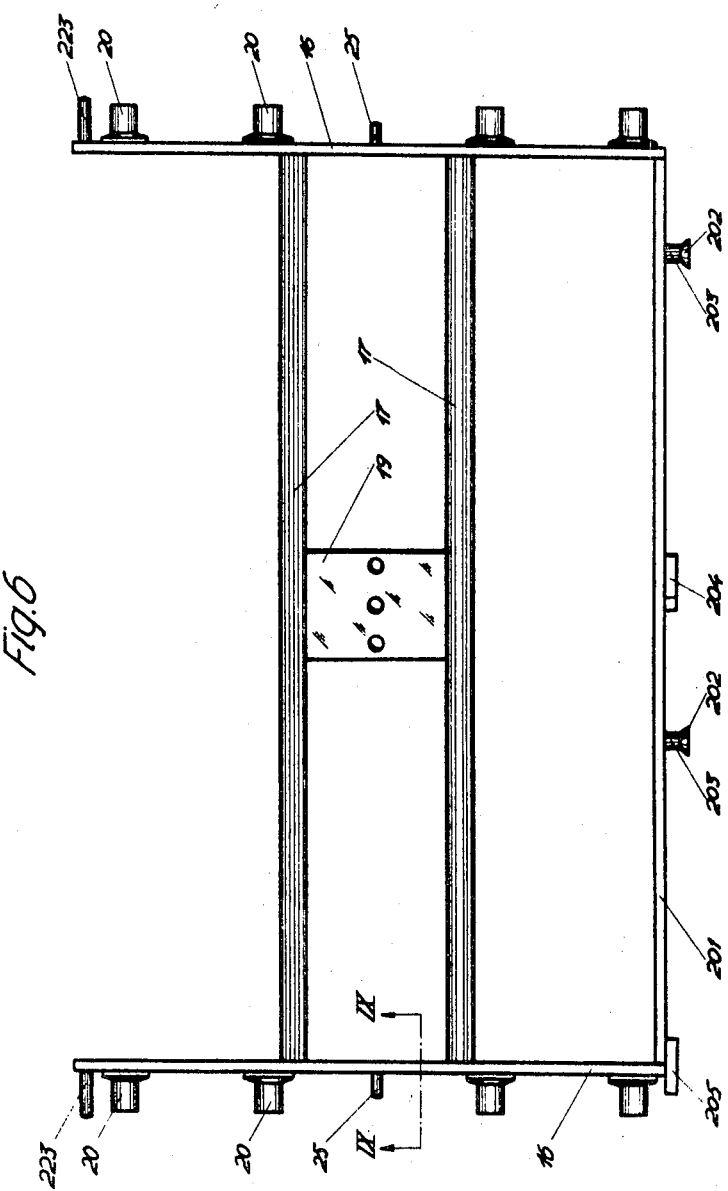

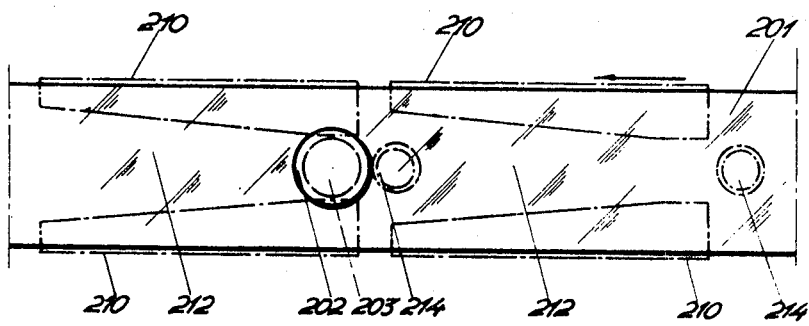
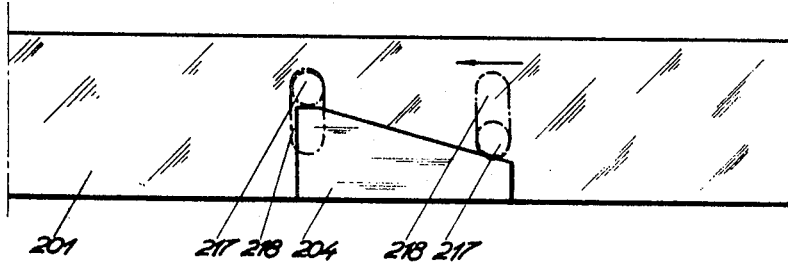
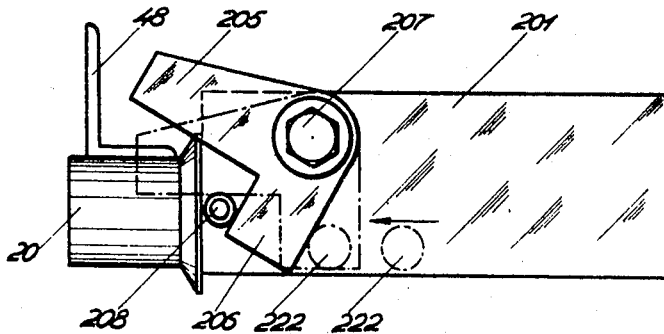

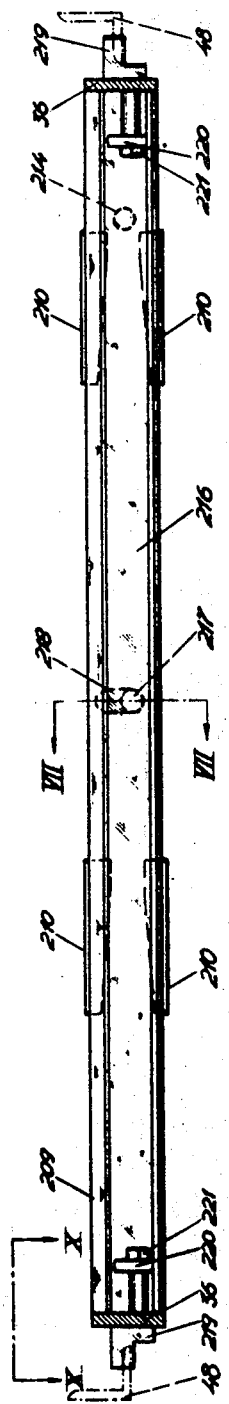
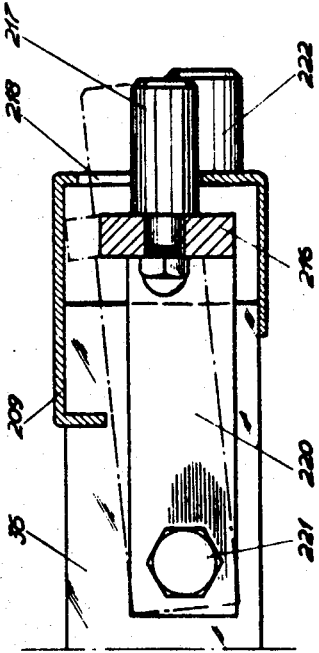

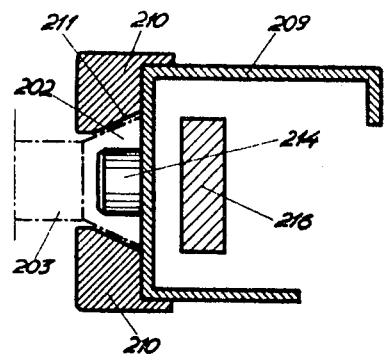
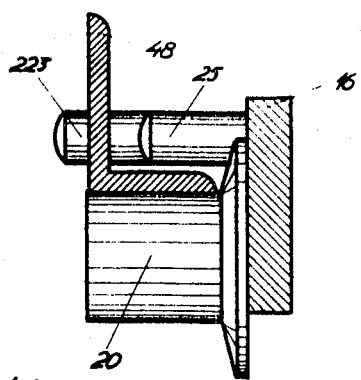
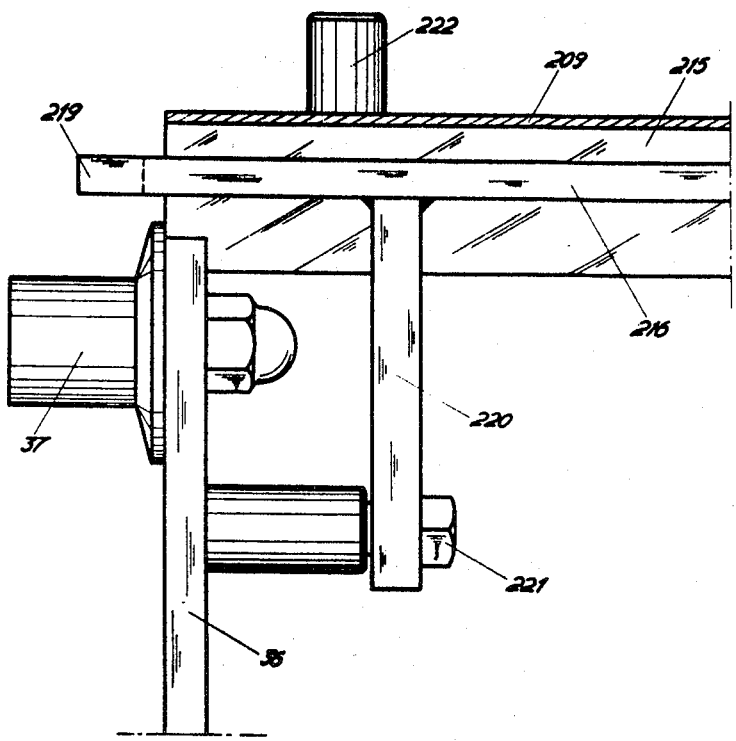

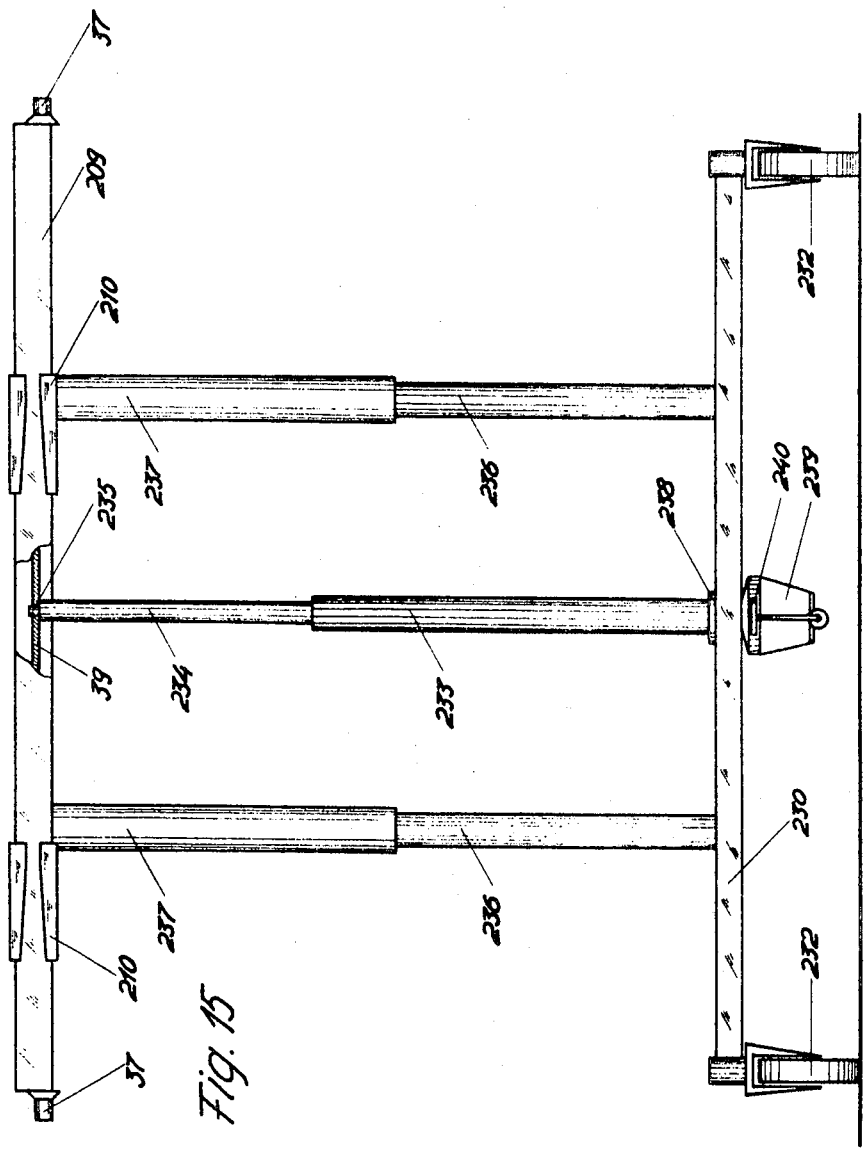

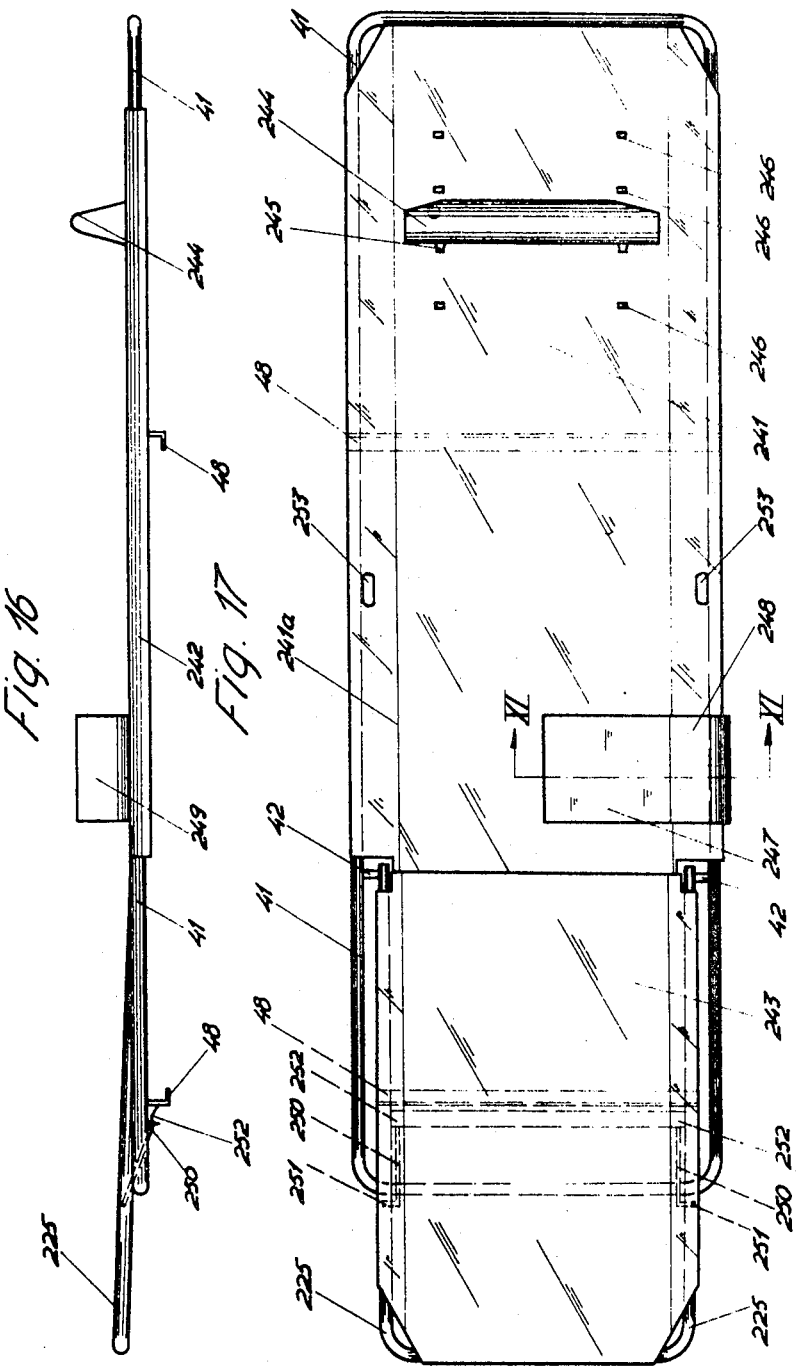

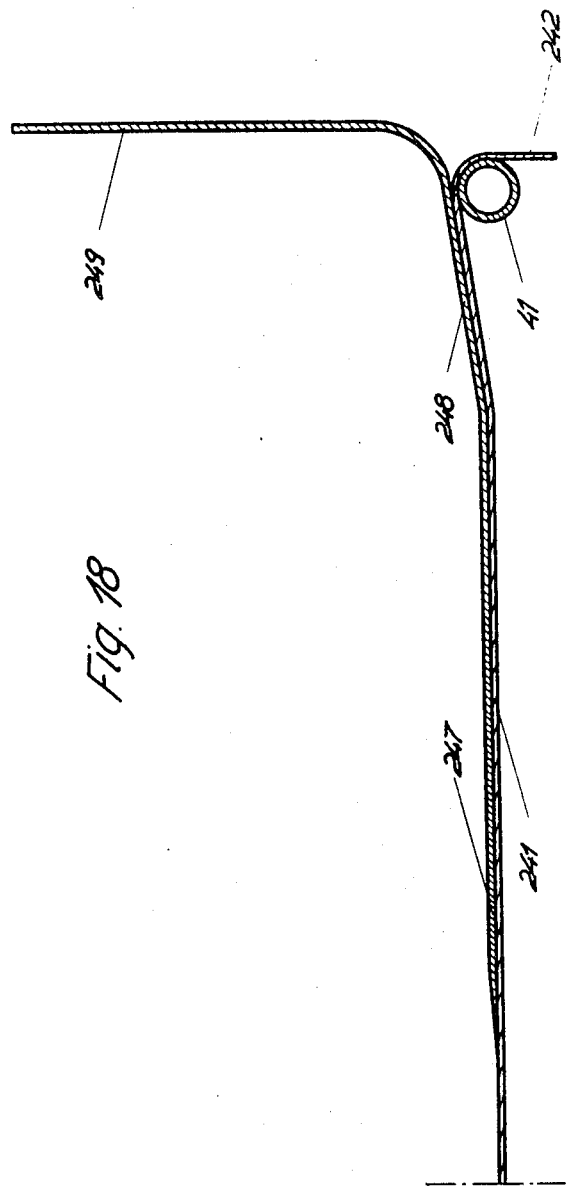

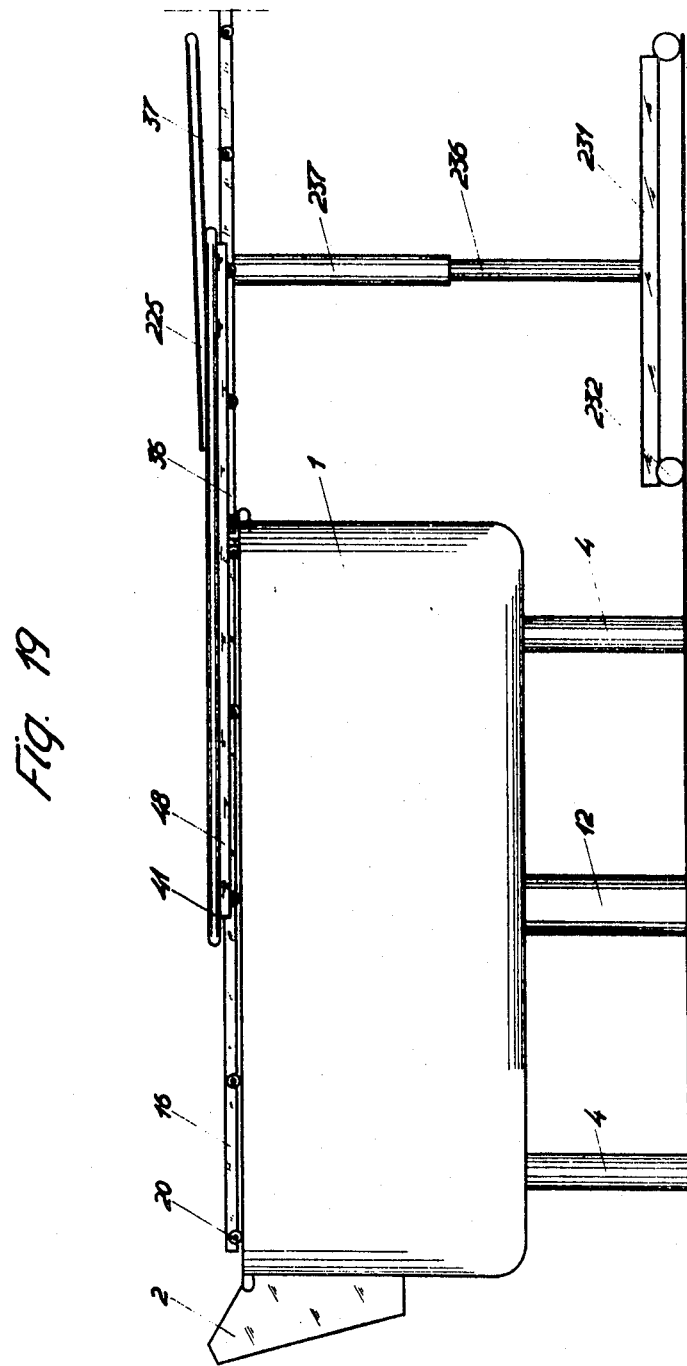

ABSTRACT OF THE DISCLOSURE

The invention relates to bathroom equipment for use by bedridden patients and comprises a carriage which can be moved alongside a bed, a horizontal stretched frame mounted on the top thereon and said stretcher frame being vertically movable, and support means mounted on top of a bathtub so that the carriage can be brought alongside the bathtub and the stretcher moved from the carriage to the bathtub during the washing operation.

A great disadvantage of past bathroom equipment for use by bedridden or old patients or both is the lack of suitable lifting and transporting devices for conveying such patients from bed to bathtub and back, in a manner such that the patient is exposed to a minimum of discomfort and such that the transporting of the patient and the work of the staff in the bathrooms is easier.

The present invention relates to the combination of a transport and lifting device for a person with a bathtub comprising:

(a) A horizontal stretcher frame for transporting a person;

(b) A vertically shiftable carriage on rollers having horizontal first stretcher frame guide and support means on the top of said carriage;

(c) Second stretcher frame guide and support means mounted along the top edges of said bathtub;

(d) Means locking together into rigid engagement said first and second guide and support means;

(e) Glide means shiftingly supporting said stretcher frame between said carriage and said bathtub; and (f) Means selectively locking said stretcher frame against horizontal movement.

According to a preferred embodiment of the invention means are provided rigidly fixed to said bathtub selectively raising and lowering said stretcher frame within the bathtub. Said raising and lowering means may comprise hydraulic cylinders within said bathtub.

Means may be provided for selectively raising and lowering said bathtub.

Advantageously said glide means (e) may comprise multiple rollers fixed to said first and second guide and support means.

Said first and second guide and support means may comprise horizontally aligned rails or tracks.

An embodiment of the invention will now be illustrated by way of example with reference to the accompanying drawings, in which:

FIG. 1 is a plan view of the bathtub and carriage, said carriage being shown in different positions by means of dotted lines, FIG. 2 is a side view of the bathtub with elevated stretcher frame, FIG. 3 is a view of the bathtub and the stretcher from the front right side of the bathtub, at which bathtub the first stretcher frame guide and support means of the carriage is in line with the second stretcher frame guide and support means of the bathtub, FIG. 4 is a front view of the carriage, having the stretcher partly pushed onto the bed of a patient, FIG. 5 is an enlarged plan view of the carriage in its moving-position and showing a part of the bathtub, FIG. 6 is an enlarged plan view of the stretcher frame guide and support means of the bathtub, FIGS. 7–9 are views of coupling means at the stretcher frame guide and support means roller of the bathtub and of the carriage taken along planes III—III, IV—IV, and V—V in FIG. 5.

FIG. 10 is a section taken on line VI—VI in FIG. 5.

FIG. 11 is a section taken on line VII—VII in FIG. 10.

FIG. 12 is a section taken on line VIII—VIII in FIG. 5.

FIG. 13 is a section taken on line IX—IX in FIG. 6.

FIG. 14 is a part of the carriage's roller gear table on large scale taken on line X—X in FIG. 10.

FIG. 15 is the carriage stand in a side view.

FIG. 16 is the stretcher frame in a side view.

FIG. 17 is the stretcher frame in a top view.

FIG. 18 is a section of the stretcher taken on line XI—XI in FIG. 17.

FIG. 19 is a front view of the carriage and bathtub, in their locked position.

Figure 1:
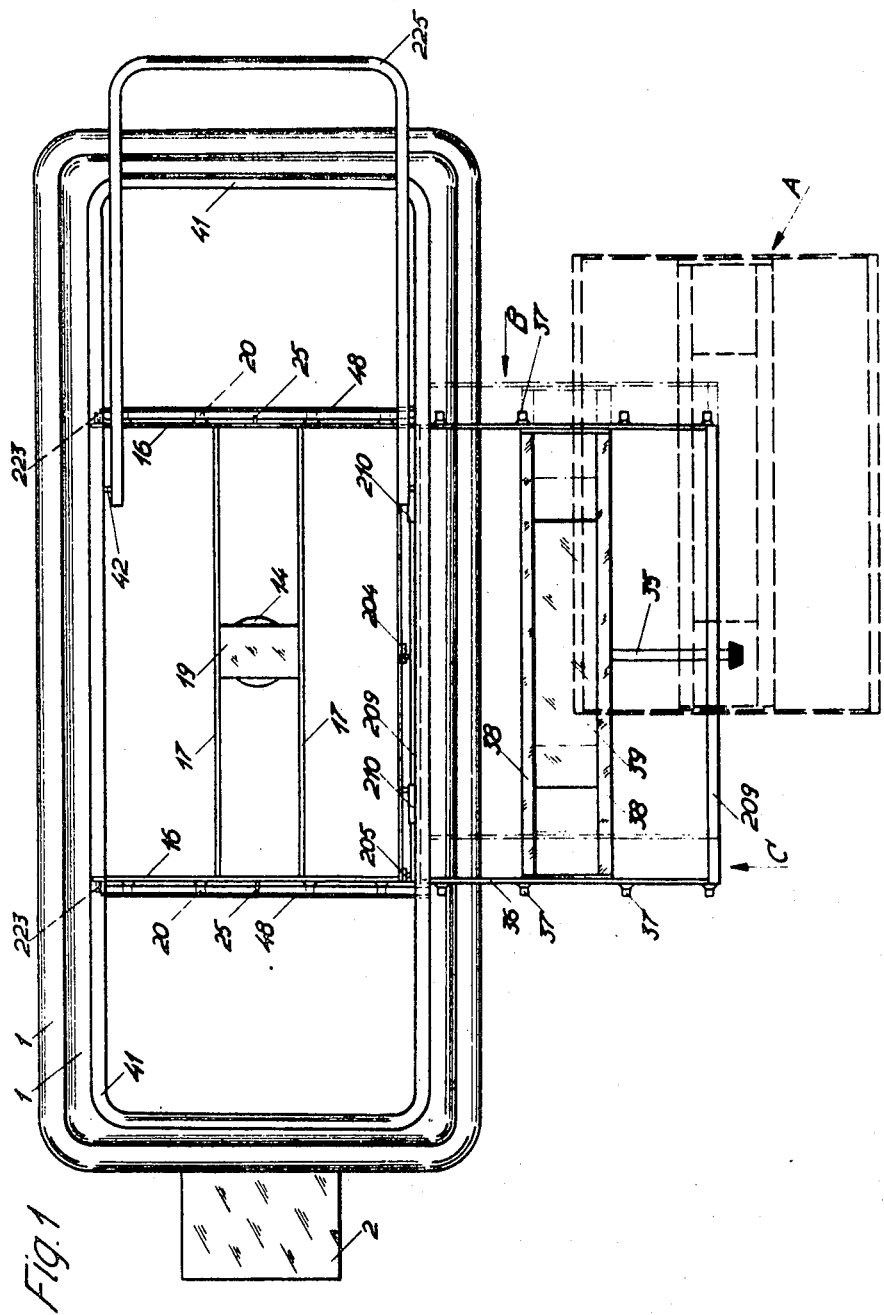

In the drawings the bathtub 1 is made of stainless steel, and at the front thereof is provided with a pulpit 2 with instruments for operating mixing apparatus for cold and warm water, a thermometer for the water, a manometer for the water pipe line pressure, a shower device and an operating device for emptying the bathtub through a pond plug 3, and with an operating device for elevating and lowering the lifting device or means of the guiding members of the bathtub.

Figure 2:
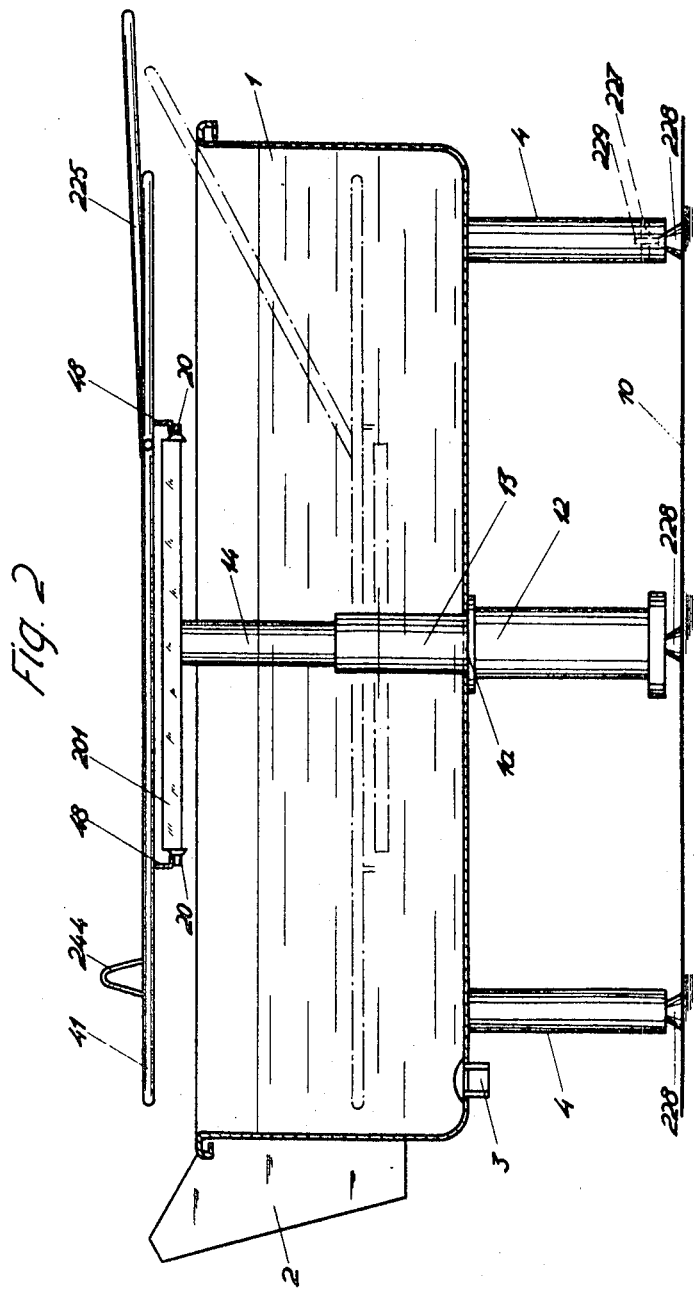

The bathtub is provided with four legs, which are vertically adjustable, every leg consisting of a cylindrical socket 4, which is provided with a retainer plate 227 with a threaded hole, in which a projecting pin 229 is screwed. The pin 229 is provided with a conical foot 228 at its lower end (FIG. 2). An opening for a hydraulic lifting device or means is arranged in the bottom of the bathtub 1, said hydraulic lifting device consisting of three telescopic cylinders 12, 13, 14, the lowest cylinder 12 being arranged under the bathtub and rests on the floor 10 of the bathroom. The upper cylinder 14 is provided at its upper portion with a first plate provided with two holes for screws. The second stretcher frame buide and support means of the bathtub is attached to the first plate by means of screws. This second stretcher frame guide and support means of the bathtub (FIG. 6), which is constituted by two parallel rails 16 and connecting pipes 17, on which a rectangular plate 19 is welded, and which is attached to first plate by two screws. The roller gear table 16, 17 can be removed from the lifting device of the bathtub. Four rollers 20 of the stretcher frame are rotatable on axles on the outside of the rails 16. In the middle and on the outside of the rails 16 pins 25 projecting at right angles are provided, which prevent lifting of the stretcher frame from the second guide and support means 16, 17.

After the second guide and support means 16, 17 is removed from the hydraulical lifting means 12–14 of the bathtub 1, the cylinders 13 and 14 can be completely drawn into the cylinder 12. In this position the opening at the bottom of the bathtub 1 is closed by a plate, so that the bathtub 1 can also be used by people, who are not confined to bed.

Figure 3:
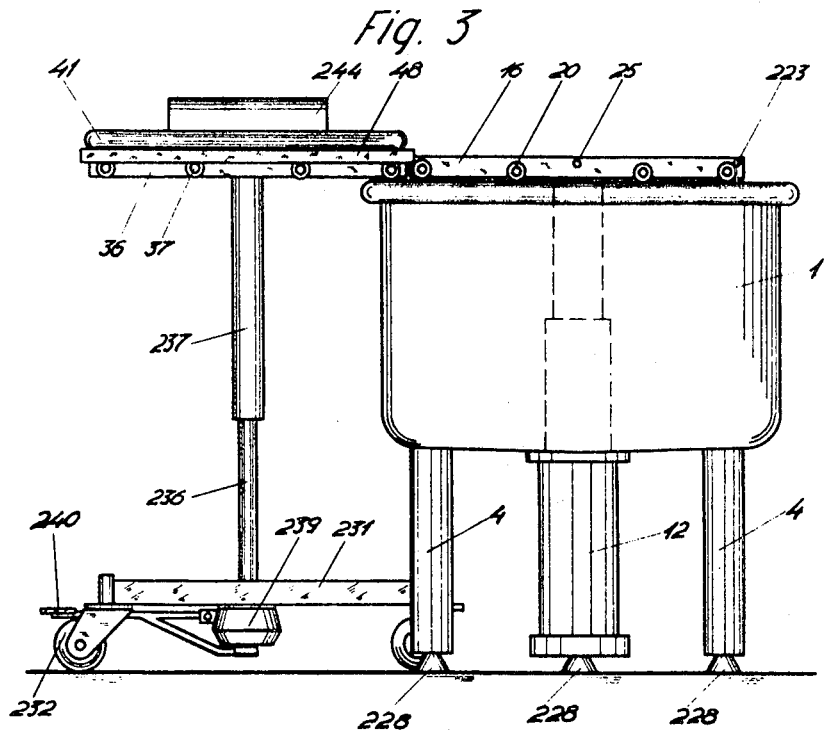

The carriage consists of a horizontal support 230 (FIG. 15), which at each end is fitted with transverse arms 23 (FIGS. 3 and 4), at which ends hinge rollers 232 are mounted. In the middle of the support 230 a vertical hydraulical cylinder 233 with piston 234 is revolvedly arranged in a bearing socket 238. The piston 234 is provided with a pin 235, which meshes into a socket. Under the support 230 the end of the cylinder 233 is provided with a pump housing 239 with an operating pedal 240. On both sides of the cylinder 233 the support 230 is provided with a vertical cylindrical pillar 236, which act as guides for vertical sockets 237 under the vertically shiftable carriage on rollers. The revolving arrangement of the hydraulical cylinder 233 with pump housing 239 and pedal 240 allow the pedal to be always adjusted so that the pedal, without regard to the carriage position, is easily accessible.

The vertical shiftable carriage on rollers (FIG. 5) consists of two parallel rails 36 and four backing rollers 37 and two pipes 38, which are attached on a plate 39, under which sockets 237 are arranged.

The stretcher (FIGS. 16 and 17) consists of a rectangular frame 41, and pivotably mounted adjacent the head of said frame 41 a U-shaped frame 225. It is evident in FIG. 2, that the U-shaped frame 225 is so long, that it always extends above the corresponding end of the bathtub 1, so that the upper part of the patient's body can be held over water regardless of the height of the stretcher frame 41 in the bathtub 1. A glass fibre plate 241 with upwardly slanted side portions 241a and downwardly directed edges 242 is attached to put into the stretcher frame 41, the plate 241 being attached to the stretcher frame 41 by means of said edges 242. A second glass fibre plate 243 is attached to the U-shaped frame 225. At the foot of said frame 41 the plate 241 is provided with a foot support, which consists of a V-shaped plate 244, which is provided with projections 245 which projections can cooperate with slots 246 in the plate 241. The stretcher is also provided with a detachable support at each side (FIG. 18), which support comprises a horizontal section 247, an upwardly slanted section 248 and a vertical section 249. The horizontal sections 247 of the supports can be pushed under the patient, who lies on the stretcher, and the vertical sections 249 support the arms of the patient.

The U-shaped frame 225 is provided with a support at the underside provided with branches 250 which are revolvingly arranged at the inner sides of the U-shaped frame 225 by means of pins. Said branches 250 being interconnected by a middle piece consisting of a profiled rail 252, by which the U-shaped frame 225 can be supported at the head of the stretcher frame 41 in order to adjust the U-shaped frame 225 in various inclined positions.

The glass fibre plate 241 is further provided with notches 253 (FIG. 17), which form handles for moving the frame 41.

In FIGS. 1 and 2 the glass fibre plates 241 and 243 are left out for the sake of clearness.

At its underside the stretcher frame 41 is provided with two transverse parallel rails 48 having an L-profile, spaced a distance from each other the same as the distance between both roller lines of the vertical shiftable carriage on rollers and those of the second stretcher guide means of the bathtub 1. With these rails the stretcher frame 41 can be horizontally displaced by means of the glide means and be transported from the carriage to the second stretcher guide means of the bathtub 1, after the first and second stretcher guide means are so adjusted, that they are joined together as hereinafter described.

The first and second guide means are outwardly provided with horizontal rails at their long sides, which rails act as an attachment means for the cooperation of said first and second guide and support means.

The second stretcher frame guide 16, 17 of the bathtub 1 is provided with only one outside rail 201, on which glide means comprising two rollers 202 are rotatably arranged on the rail 201 and at right angles to projecting horizontal axles 203 (FIG. 5). Between the rollers 202 a wedge-shaped projection 204 is arranged on the middle part of the rail 201 and at the outside left end of the rail 201 is mounted an angle member 205, 206 which is revolving attached to the rail 201 at right angles to the projecting bolt 207. The angle member 205, 206 is so constructed, that it rests against a pin 208 on the rail 201. The angle member 205 is arranged in the path of the rail 48 of the frame 41 and prevents displacing of the frame 41 from the second stretcher frame guide 16, 17 of the bathtub 1.

At two opposite sides the first stretcher frame guide 36, 38 of the carriage is provided with an outside rail 209 having a U-shaped cross-section (FIGS. 10–12). Two pairs of wedge-shaped projections 210 with inwardly directed oblique edges 211 are attached at the outside of the connection-piece of the U-shaped rail, said projections 210 forming two wedge-shaped notches, whose cross section corresponds to the profile of the rollers 202 (FIG. 12). Near the smaller end of the right notch 212 the U-shaped rail 209 is provided with a projecting pin 214. A flat bar rail 216 extends through the canal 215 of the U-shaped rail 209, which rail is provided at about its middle with a projecting pin 217, which is guided in a vertical notch 218 in the connection-piece of the U-shaped rail 209. The notched ends 219 of the rail 216 reach over the ends of the U-shaped rail 209 and the side pieces 36 of the first stretcher frame guide, so that they align with rail 48 of the frame 41 (FIG. 10). Near the ends of the rail 216 arms 220 are welded onto its inside, which arms with their free ends are pivotably attached to bolts 221 at the insides of the side pieces 36 (FIG. 14). Near one end of the U-shaped rail 209 there is also provided projecting pin 222.

Figure 4:
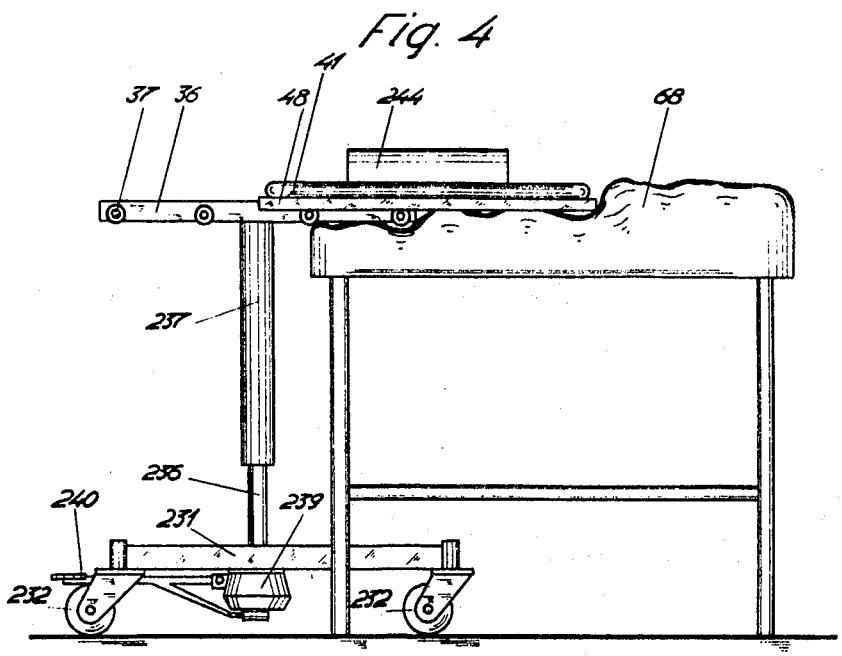

The apparatus works as follows:

The patient is transported from the bed 68 on to the carriage as follows: the carriage with the first stretcher frams guide 36, 38 is adjusted to the height of the bed and placed alongside the bed (FIG. 4). Then the rail 216 is elevated by hand, so that its ends 219 are moved out of the path of the rail 48 of the frame 41, whereafter the frame 41 is pushed partly into the bed 68. The patient is then transported on to the stretcher, the frame 41 of which is held in horizontal position by the pins 224 at the rails 36, whereafter the frame 41 is pushed back and the rail 216 is lowered. The carriage can then be driven into the bathroom, where the first stretcher frame guide 36, 38 and the second stretcher frame guide 16, 17 of the bathtub are elevated into the upper position. In FIG. 1 the carriage is drawn in dash lines in an initial position A, in which the carriage is driven to the bathtub 1 and in a position B, in which the U-shaped rail 209 is adjacent to the outer surfaces of the rollers 202. Then the carriage is pushed to the left. The first stretcher frame guide 36, 38 glides against the rollers 202 as shown in position C.

During the last described movement the following happens: The wedge-shaped pairs of projections 210 each covers its roller (FIG. 7) in which position the first stretcher frame guide 36, 38 of the carriage is finely adjusted and centered in relation to the second stretcher frame guide 16, 17 of the bathtub in vertical direction, until the pin 214 knocks against the roller 202 exactly in the correct moving-position, in which position the rollers 20 of the carriage and the rollers 37 of the bathtub 1 are aligned. The projections 210 are now completely engaged with the rollers 202, and the carriage cannot be moved away from the bathtub 1.

During this movement of the carriage into moving-position the pin 217 in the U-shaped rail 209 glides upwardly on the wedge-shaped projection 204 at the second stretcher frame guide of the bathtub (FIG. 8), so that the rail 216 with its ends 219 is moved out of the path of rail 48 of the frame 41.

Finally the pin 222 at the first stretcher frame guide of the carriage knocks against the lower branch 206 of the angle 205, 206 at the second stretcher frame guide of the bathtub, causing the branch 205 to be elevated out of the path of the rail 48 by pin 208 (FIG. 9).

Now the frame 41 can be moved from the backing rollers 37 on to the backing rollers 20, until the rails 48 abut against the stop pins 223 at the back part of the roller gear table of the bathtub. By moving the frame 41 onto the second stretcher frame guide 16, 17 of the bathtub the rails 48 are guided under the pins 25, so that the rails 48 also are locked against vertical movement. After that the carriage is removed from the bathtub by being moved to the right first, causing both stretcher locking devices to come again into their locking position, after which the carriage can be removed from the bathtub.

After that the second stretcher frame guide 16, 17 of the bathtub 1 with the stretcher frame 41 and the patient are let down into the water. Then the frame 41 is elevated and adjusted by the staff of the bathroom to a suitable height for soaping and brushing the patient. After brushing, the patient is let down again into the water for rinsing, after which the bathing operation is finished by douching and drying. Then the carriage is put alongside the bathtub again and coupled together with the second stretcher frame guide 16, 17 of the bathtub 1 and the frame 41 is moved on to the first stretcher frame guide 36, 38 of the carriage, on which it is automatically locked, whereafter the patient is transported to his bed.

By moving the frame 41 from the bathtub on to the carriage the outward movement of the frame is stopped by the ends 219 of the first stretcher frame guide 36, 38 of the carriage.

The length of the pins 217, 222 is adapted to the wedge-shaped projection 204 and the angle 205, 206, in such a way, that the pin 217 and the angle 205, 206 cannot be displaced, if the rollers 202 have not come into proper engagement with the wedge-shaped notches 212.

The arrangement of the cooperating means, i.e. the rollers, the projections, the pins and the angle, can be altered, so that the rollers 202 for example are arranged at the U-shaped rail 209 and the wedge-shaped projections 210 at the rail 201.

As FIG. 19 shows, the roller gear tables can be so constructed, that an engagement is possible by one side of the carriage with one side of the bathtub.

I claim:

1. The combination of a transport and lifting device for a person with a bathtub comprising:
   (a) a horizontal stretcher frame for transporting a person;
   (b) a vertically shiftable carriage on rollers having horizontal first stretcher frame guide and support means at the top of said carriage;
   (c) second stretcher frame guide and support means mounted along the top edges of said bathtub;
   (d) means locking together into rigid engagement said first and second guide and support means;
   (e) glide means shiftingly supporting said stretcher frame between said carriage and said bathtub; and
   (f) means selectively locking said stretcher frame against horizontal movement.

2. In the combination according to claim 1 means rigidly fixed to said bathtub selectively raising and lowering said stretcher frame within said bathtub.

3. In the combination according to claim 1 means selectively raising and lowering said bathtub.

4. In the combination according to claim 1 said glide means (e) comprising multiple rollers fixed to said first and second guide and support means.

5. In the combination according to claim 1 said first and second guide and support means comprising horizontally aligned rails or tracks.

6. In the combination according to claim 2 said raising and lowering means comprising hydraulic cylinders within said bathtub.

References Cited

UNITED STATES PATENTS

| | | | |
|---|---|---|---|
| 1,263,611 | 4/1918 | Scroggins | 4—185 |
| 1,683,430 | 9/1928 | Wright | 4—185 |
| 1,892,274 | 12/1932 | Henschen | 4—185 |
| 2,187,283 | 1/1940 | Scheutz | 4—185 |
| 2,565,761 | 8/1951 | Dean | 4—185 |
| 2,680,855 | 6/1954 | Robinson | 4—185 |
| 2,968,814 | 1/1961 | Ashby | 4—185 |
| 3,104,399 | 9/1963 | Dalton | 4—185 |

FOREIGN PATENTS 240,882  11/1910  Germany.

LAVERNE D. GEIGER, Primary Examiner

D. MASSENBERG, Assistant Examiner